(12) United States Patent
Chen et al.

(10) Patent No.: US 6,532,819 B1
(45) Date of Patent: Mar. 18, 2003

(54) WIDEBAND PIEZOELECRIC TRANSDUCER FOR HARMONIC IMAGING

(76) Inventors: Jie Chen, 99 Meadowood Rd., North Andover, MA (US) 01845; Rajesh Panda, 4 Newcastle Dr., Apt. 2, Nashua, NH (US) 03060; Patrick G Rafter, 32 Bear Hill Rd., Windham, NH (US) 03087; Turuvekere R Gururaja, Flat A, 4/F Woodbury Court No. 10 Parkvale Drive, Discovery Bay (HK)

(*) Notice: Subject to any disclaimer, the term of this patent is extended or adjusted under 35 U.S.C. 154(b) by 0 days.

(21) Appl. No.: 09/515,346

(22) Filed: Feb. 29, 2000

(51) Int. Cl.$^7$ .............................................. G01N 29/00
(52) U.S. Cl. ....................................................... 73/606
(58) Field of Search .......................... 73/627, 628, 629, 73/632, 606; 310/311, 320, 321, 322, 334, 335, 336, 360

(56) References Cited

U.S. PATENT DOCUMENTS

| | | | |
|---|---|---|---|
| 5,295,487 A | 3/1994 | Saitoh et al. .......... | 128/662.03 |
| 5,402,791 A | 4/1995 | Saitoh et al. .......... | 128/662.03 |
| 5,438,998 A * | 8/1995 | Hanafy .................. | 128/662.03 |
| 5,740,128 A | 4/1998 | Hossack et al. ............ | 367/138 |
| 5,833,613 A | 11/1998 | Averkiou et al. ........... | 600/440 |
| 5,879,303 A | 3/1999 | Averikiou et al. .......... | 600/447 |
| 5,913,823 A | 6/1999 | Hedberg et al. ............ | 600/443 |
| 5,998,910 A | 12/1999 | Park et al. ................... | 310/358 |
| 6,238,481 B1 * | 5/2001 | Yamashita et al. ............ | 117/84 |

OTHER PUBLICATIONS

J. Kuwata, K. Uchino and S. Nomura, Ferroelectrics, vol. 37, pp. 579–582, 1981.
S.E. Park and T.R. Shrout, IEEE Trans. Ultrason., Ferroelectro., and Freq. Contr., vol. 44, No. 5, pp. 1140–1147, 1997.
B. Kulwicki, A. Amin and A. Safari, IEEE International Symposium on Applications of Ferroelectrics, vol. II, pp. 543–546, 1996.
J. Chen and T.R. Guraraja, "DC–Biased Electrostrictive Materials and Transducers for Medical Imaging".
S. Saitoh, et al., IEEE Trans. Ultrason., Ferroelectro., and Freq. Contr., vol. 46, No. 2, pp. 414–420 Mar. 1999.
J. Kuwata, K. Uchino and S. Nomura, Japanese Journal of Applied Physicals, vol. 21, No. 9, pp. 1298–1302, Sep., 1982.
T. Inoue, M. Ohta and S. Takahashi, IEEE Trans. Ultrason., Ferroelectro., and Freq. Contr., vol. UFFC–34, No. 1, pp. 8–15, Jan. 1987.
H. Takeuchi, H. Masuzawa, C. Nakaya and Y. Ito, 1989 Ultrasonics Symposium, 1989 IEEE, pp. 705–708.
H. Takeuchi, H. Masuzawa, C. Nakaya and Y. Ito, 1990 Ultrasonics Symposium, 1990 IEEE, pp. 697–705.
T. Inoue, M. Ohta and S. Takahashi, IEEE Trans. on Ultrasonics, Ferroelec. and Freq. Control, vol. UFFC–34, No. 1, Jan. 1987, pp. 8–15.
S. Saitoh, T. Kobayashi, et al, IEEE Trans. on Ultrasonics, Ferroelec. and Freq. Control, vol. 46, No. 1, Jan., 1999, pp 152–157.

(List continued on next page.)

Primary Examiner—Richard A. Moller
(74) Attorney, Agent, or Firm—Tony Piotrowski

(57) ABSTRACT

The present disclosure relates to an imaging system for harmonic imaging of an object in a medium. The system comprises a transducer formed of a single crystal of a piezoelectric material, a transmitter for transmitting waves into the medium, a receiver for receiving echoed waves from the medium, and a control system electrically connected to the transmitter and the receiver which is used control the operation of the transmitter and interpret signals received by the receiver. In a preferred embodiment, the single crystal of piezoelectric material comprises a PMN-PT material or a PZN-PT material. Through use of this material, −6 dB bandwidths of at least approximately 95% are obtainable.

47 Claims, 7 Drawing Sheets

OTHER PUBLICATIONS

T. Gururaja American Ceramic Society Bulletin, vol. 73, No. 5, pp. 50–55, May 1994.

R.K. Pandey, Michael Liu, Ahmad Safari, ISAF ' 94 Proceedings of the Ninth IEEE, pp. 363–364, Aug. 7–Aug. 10, 1994.

R.K. Pandey, Michael Liu, Ahmad Safari, ISAF ' 94 Proceedings of the Ninth IEEE, pp. 158–161, Aug. 7–Aug. 10, 1994.

M. Kulwicki, A. Amin and A. Safari, ISAF ' 96 Proceedings of the Tenth IEEE, vol. I, pp. 27–30, Aug. 18–21, 1996.

R. Panda, J. Chen, H. Beck and T. Gururaja, The $9^{th}$ US–Japana Seminar on Dielectric & Piezoelectric Ceramics Program Summary and Extended Abstract, pp. 143–146, Nov. 2–5, 1999.

T.Gururaja, et al, Medical Ultrasonic Transducers with Switchable Frequency Bands Centered about $f_0$ and $2f_0$ pp. 333–337.

P. Panda, J. Chen, et al, Single Crystal Transducers for Medical Imaging Applications.

Recent developments in relaxor single crystals for ultrasonic transducers and actuators.

* cited by examiner

WIDEBAND PIEZOELECRIC TRANSDUCER FOR HARMONIC IMAGING

FIELD OF THE INVENTION

The present disclosure relates to wideband piezoelectric transducers for harmonic imaging. More particularly, the disclosure relates to wideband piezoelectric single crystal transducers which can be used to cover fundamental to at least third harmonic frequencies.

BACKGROUND OF THE INVENTION

Ultrasonic imaging has quickly replaced conventional X-rays in many clinical applications because of its image quality, safety, and low cost. Ultrasonic images are typically formed through use of phased or linear array transducers which are capable of transmitting and receiving pressure waves directed into a medium such as the human body. Such transducers normally comprise multielement piezoelectric materials which vibrate in response to an applied voltage to produce the desired pressure waves.

To obtain high quality images, the transducer must be constructed so as to produce specified frequencies of pressure waves. Generally speaking, low frequency pressure waves provide deep penetration into the medium (e.g., the body), but produce poor resolution images due to the length of the transmitted wavelengths. On the other hand, high frequency pressure waves provide high resolution, but with poor penetration. Accordingly, the selection of a transmitting frequency has involved balancing resolution and penetration concerns. Unfortunately, resolution has suffered at the expense of deeper penetration and vice versa. Traditionally, the frequency selection problem has been addressed by selecting the highest imaging frequency which offers adequate penetration for a given application. For example, in adult cardiac imaging, frequencies in the 2 MHz to 3 MHz range are typically selected in order to penetrate the chest wall.

Recently, new methods have been studied in an effort to obtain both high resolution and deep penetration. One such method is known as harmonic imaging. Harmonic imaging is grounded on the phenomenon that objects, such as human tissues, develop and return their own non-fundamental frequencies, i.e., harmonics of the fundamental frequency. Due to this fact, and to the increased image processing capabilities of digital technology, it is possible to excite the object to be imaged by transmitting at a low (and therefore deeply penetrating) fundamental frequency ($f_o$) and receiving at a harmonic wave having a higher frequency (e.g., $2f_o$) that can be used to form a high resolution image of the object. By way of example, a wave having a requency less than 2 MHz can be transmitted into the human body and one or more harmonic waves having frequencies greater than 3 MHz can be received to form the image. By imaging in this manner, deep penetration can be achieved without a concomitant loss of image resolution.

Harmonic imaging can also be particularly effective when used in conjunction with contrast agents. In contrast harmonic imaging, gas or fluid filled micro-sphere contrast agents are typically injected into a medium, normally the bloodstream. Because of their strong nonlinear characteristics when insonified at particular frequencies, contrast agent resonation can be easily detected. Therefore, injection of contrast agents into the body can enhance the imaging capability in the detection of blood-filled structures and blood flow velocity in the arterial system. For instance, contrast harmonic imaging is especially effective in detecting myocardial boundaries, assessing microvascular blood flow, and detecting myocardial perfusion.

Despite the advantages possible with harmonic imaging (both tissue and contrast), serious limitations to its utilization exist. In particular, due to the need for transmitting and receiving both high and low frequency waves when performing harmonic imaging, the transducer used must have a very large bandwidth. In different applications, multiple second harmonic frequency selections may be required to obtain acceptable penetration and resolution. Similarly, a particular contrast agent may resonate better at a specific imaging frequency.

Obtaining wide bandwidths from the small piezoelectric elements currently used in phased array transducers is particularly difficult. Present day transducers are typically made of lead zirconate titanate (PZT) based ceramics. Such transducers typically have a −6 dB bandwidth of 55% to 85%. Unfortunately, this bandwidth is barely enough to cover the frequency range of the fundamental and second harmonic and therefore the harmonic performance is limited. A wider bandwidth transducer which covers multiple pair of second harmonics and even the third harmonic is required to improve harmonic imaging.

To cite a specific example, transesophageal probes create challenges in conducting harmonic imaging due to the bandwidth limit. Since there is no chest wall attenuation, transesophageal probes typically operate at higher frequencies for better resolution, typical 5–7 MHz. Harmonic study requires the probe to be operated at a much lower frequency to burst contrast agents, typically 2–3 MHz. The required tissue harmonic imaging frequencies are also much lower than the high resolution imaging frequencies. The PZT-type transducers cannot offer the bandwidth to perform both harmonic and high resolution imaging from one transducer. This has prevented the use of transesophageal probes in tissue and contrast harmonic imaging applications.

Recently, vastly improved electromechanical properties have been observed with single crystals of $Pb(Zn_{1/3}Nb_{2/3})O_3$—$PbTiO_3$ (PZN-PT) and $Pb(Mg_{1/3}Nb_{2/3})O_3$—$PbTiO_3$ (PMN-PT). Using these materials, longitudinal coupling constants, $k_{33}$, of 85% to 93% have been observed as compared with conventional PZT-type ceramics which normally exhibit a $k_{33}$ value of approximately 70% to 75%. As known in the art, the coupling constant, $k_{33}$, represents the efficiency of conversion of electrical energy to mechanical energy and vice versa. This high coupling of PZN-PT and PMN-PT single crystals provides the potential for improved sensitivity and bandwidth in transducer design.

Obstacles to the use of PZN-PT and PMN-PT single crystals still exist despite the greatly improved performance they can provide. For instance, although the single crystals have relatively high free dielectric constant, the clamped dielectric constant, $K_s$, is very low (e.g., $K_s$=800–1400) for compositions near the morphotropic phase boundary (MPB). For phased array transducers with small element sizes, the impedance of single crystal transducers is relatively high and this may cause electrical mismatch between the transducer and the system transmitter which reduces the sensitivity and bandwidth of the single crystal transducers.

Although lead-based single crystals provide high coupling, they also have high acoustic impedance. Effectively coupling the acoustic energy from single crystals with high acoustic impedance into the medium with low acoustic impedance is also critical for achieving broad bandwidth.

Another obstacle to the use of PZN-PT and PMN-PT materials is the temperature stability of the materials.

Specifically, these materials have lower Curie temperatures at the rhombohedral phase compositions in comparison to the typical PZT-type ceramics used for medical imaging applications. The phase transition between rhombohedral to tetragonal occurs at an even lower temperature. Therefore, these materials are more susceptible to depoling during use.

It can, therefore, be appreciated that it would be desirable to have a piezoelectric transducer which possesses both a very wide bandwidth and high sensitivity so as to be well-suited for imaging of fundamental to at least third harmonic frequencies. Furthermore, it would be desirable to have such a transducer which also avoids the problems discussed in the foregoing.

SUMMARY OF THE INVENTION

The present disclosure relates to an ultrasonic imaging system for harmonic imaging of an object in a medium. The system comprises a transducer formed of a single crystal of a piezoelectric material, a transmitter which causes the transducer to transmit fundamental ultrasonic signals into the medium, a receiver for receiving harmonic ultrasonic signals from the object in the medium, and a control system electrically connected to the transmitter and the receiver which is used control the operation of the transmitter and the receiver.

In a preferred embodiment, the single crystal of piezoelectric material comprises a PMN-PT material or a PZN-PT material. Through use of this material, −6 dB bandwidths of at least approximately 95% are obtainable.

In addition, the present disclosure relates to an ultrasonic imaging method for imaging an object. The method comprises the steps of causing a transducer formed of a single crystal of piezoelectric material to emit an ultrasound signal at a fundamental frequency, receiving first echoes at a harmonic frequency of the fundamental frequency, receiving second echoes at another harmonic frequency of the fundamental frequency, and processing the first and second echoes to produce an image of the object.

In a preferred embodiment, at least the third harmonic frequency is received and used for imaging. In another embodiment, at least two of the harmonic frequency signals can be received separately at the same time, and combined to form a hybrid image. Alternatively, first and second fundamental frequencies can be transmitted simultaneously such that the second harmonic frequency of one is substantially the same frequency of the third harmonic frequency of the other. In addition, the second and third harmonic signals of the transmitted echoes can be received simultaneously to form a mixed image.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Transducer Construction and Manipulation

Figure 1:
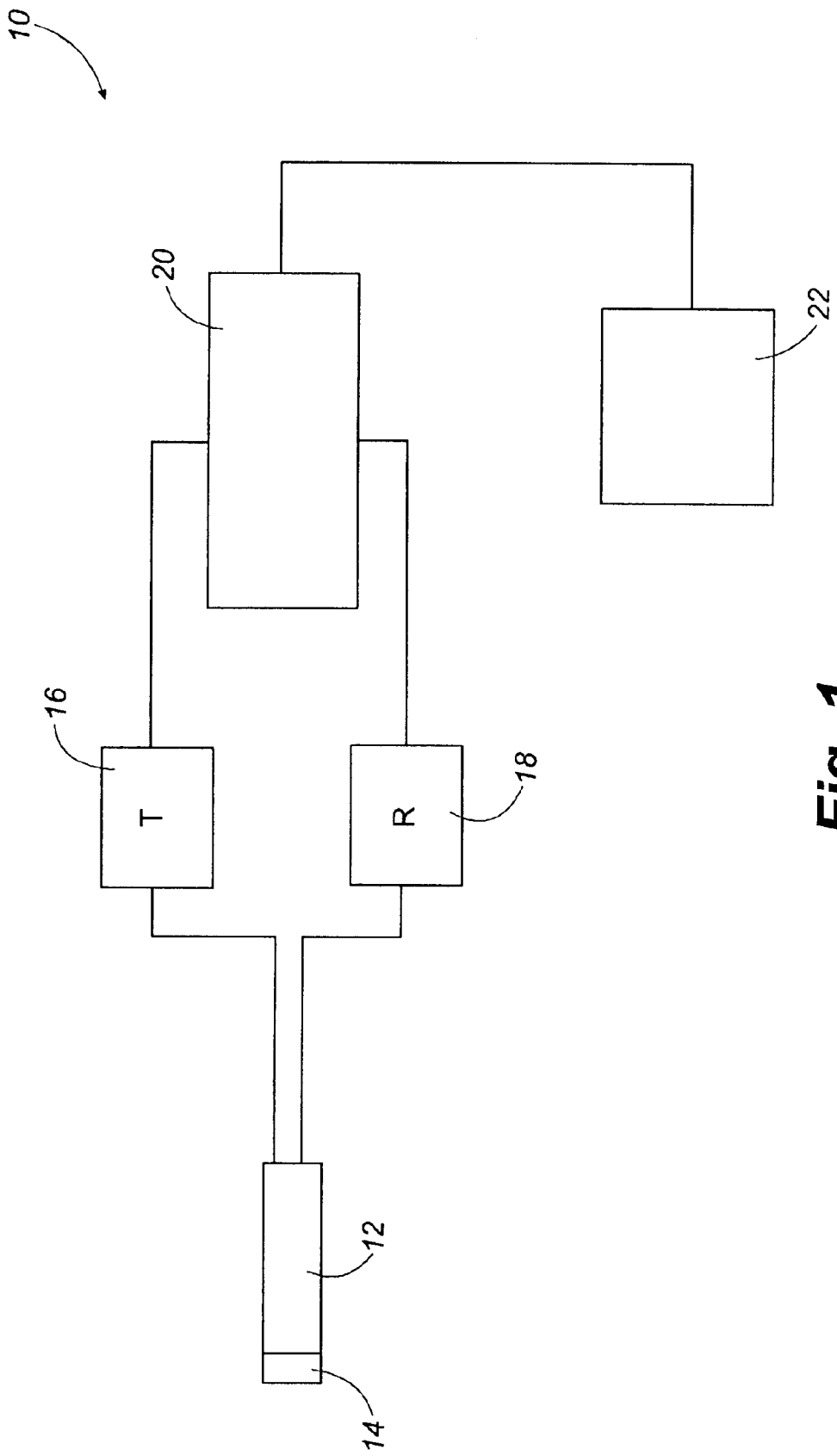
FIG. 1 is a simplified schematic of an ultrasonic imaging system.

As identified in the foregoing, increased sensitivity and bandwidth are needed to successfully image objects such as human organs with tissue and/or contrast harmonic imaging. Improved electromechanical properties, such as the coupling constant, $k_{33}$, are needed to produce high sensitivity and wide bandwidth. To achieve these desired goals, the present invention preferably utilizes single crystals composed of PMN-PT and/or PZN-PT.

In view of the potential for improved results possible with single crystals of PMN-PT and PZN-PT, single crystal transducer elements were constructed and their electromechanical properties evaluated. For the purposes of the present invention, the term single crystal is used to denote oriented polycrystals, in which the crystal comprises very few grains (all aligned in the same direction), and single grain crystals, in which the crystal comprises a single grain of material only. To fabricate these elements, chemical grade PbO, MgO, ZnO, $Nb_2O_5$, and $TiO_2$ were first used to form PMN-PT and PZN-PT compositions. In the experimentation, the PMN-PT compositions had PT concentrations in the range of approximately 10% to 35% mol %, while the PZN-PT compositions had PT concentrations in the range of 4.5% to 9% mol %. Once these compositions were formed, PMN-PT and PZN-PT single crystals were grown using the Bridgman and flux technique, and were oriented using the Laue back reflection method. Next, the crystals were sliced using an ID saw parallel to the (001), (011), and (111) planes to approximately 1 mm in thickness. To determine the best possible orientation cut for the crystals, several experimental crystals were constructed and evaluated.

From Table I, it can be appreciated that several different thickness/width cut orientations can be beneficially used in creating the transducer. Due to the particularly desirable properties obtained from single crystal wafers having <001> and <011> thickness orientations, these wafers were used in constructing transducers. Once the wafers were sliced, they then were lapped and polished. Gold coating was then applied to both surfaces of the wafers to form electrodes. The single crystal wafers were then diced on dicing saw into thin slivers with various width orientation cuts. The slivers then were poled at room temperature and measured.

After fabrication was completed, the electromechanical properties of the various single crystal slivers were evaluated. In particular, the PMN-PT and PZN-PT slivers with thickness and width orientations of $<001>_t/<010>_w$, and $<011>_t/<110>_w$ 50-75 degree cuts (including $<011>_t/<211>_w$, $<011>_t/<522>_w$, and $<011>_t/<311>_w$) were characterized. For one dimensional (1D) transducer applications, the single crystal elements were diced into one dimensional or quasi-one dimensional sliver shapes where the length>height>width. In this case, not only the thickness orientations, but also the width orientations, affect the electromechanical properties of the slivers. Here, the effective coupling constant ($k_{33}'$ for slivers) replaces the longitudinal coupling constant ($k_{33}$ for bars) due to the clamping effect from the length dimension of the sliver. By effectively selecting the thickness and width orientations, very high $k_{33}'$ (from 0.70 to 0.90) for sliver samples can be obtained, which is very close to the $k_{33}$ value of bar samples. Table III lists the piezoelectric and dielectric properties of some of these slivers. As shown in the table, very high effective coupling constants, were obtained for these slivers ($k_{33}'$=84% to 90%).

TABLE I

Effective coupling constants and dielectric constants of PMN-PT and PZN-PT slivers

|  | Effective Coupling Constant ($k_{33}'$) | Clamped Dielectric Constant (K) |
|---|---|---|
| PMN-PT 30–32% (rhombohedral) |  |  |
| $<001>_t/<010>_w$ | 0.86–0.89 | 1400 |
| $<011>_t/<211>_w$ | 0.90 | 1100 |
| $<011>_t/<522>_w$ | 0.90 | 1100 |
| $<011>_t/<311>_w$ | 0.90 | 1100 |
| $<011>_t/<110>_w$ 35 degrees | 0.72 | 1100 |
| PZN-PT 4.5% PT (rhombohedral) |  |  |
| $<001>_t/<010>_w$ | 0.84–0.87 | 1100 |
| PZN-PT 8% PT (rhombohedral) |  |  |
| $<001>_t/<010>_w$ | 0.85–0.88 | 900 |

Utilizing the large coupling constant, $k_{33}$, obtainable with such single crystals of PMN-PT and PZN-PT, in conjunction with additional improvements such as multiple matching layers, voltage biasing, and multiple-layer design, described hereinafter, single crystal transducers can be designed with extremely wide bandwidth. In particular, the additional bandwidth achieved through the use of single crystal transducers, higher harmonic frequencies, even those beyond the second harmonic, can be imaged. In addition, such a single crystal transducer with more than 100% can offer a wide range of second harmonic frequency choices. As will be understood by persons having ordinary skill in the art, this additional bandwidth creates several application possibilities which either were not possible with conventional transducers, or which were not nearly as useful due to the limitations of such transducers. These applications are described herein.

FIG. 1 provides a simplified schematic representation of an ultrasonic imaging system 10 utilizing a single crystal transducer element constructed in accordance with the foregoing. As indicated in FIG. 1, the system 10 generally comprises a transducer 12 (e.g., a transesophageal probe) which includes piezoelectric elements 14 used to transmit and receive pressure waves. The preferred forms of this piezoelectric element 14 are described in detail hereinafter.

In addition to the transducer 12, the ultrasonic imaging system 10 includes a transmitter (e.g., pulse generator) 16 which transmits voltage to the transducer 12. The system 10 further includes a receiver 18 which receives electrical signals converted by the transducer 12 from the echoed pressure waves received from the medium. Each of the transmitter 16 and receiver 18 is electrically connected to a control system 20 with which the operator can control the operation of the transmitter 16 and interpret signals from the receiver 18. As will be appreciated by persons having ordinary skill in the art, the control system 20 can include one or more processors, computers, and other hardware and software components implementing and controlling the overall operation of the ultrasonic imaging system 10. In addition, the control system 20 normally includes software which comprises an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer readable medium can be, for instance, an electronic, magnetic, optical, electromagnetic, infrared, or semiconductor system, apparatus, device, or propagation medium. Finally, the ultrasonic imaging system 10 includes a display 22 with which tomographic images and/or oscilloscopic traces can be displayed along with any other tabulated and/or calculated information that would be useful to the operator.

Figure 2:
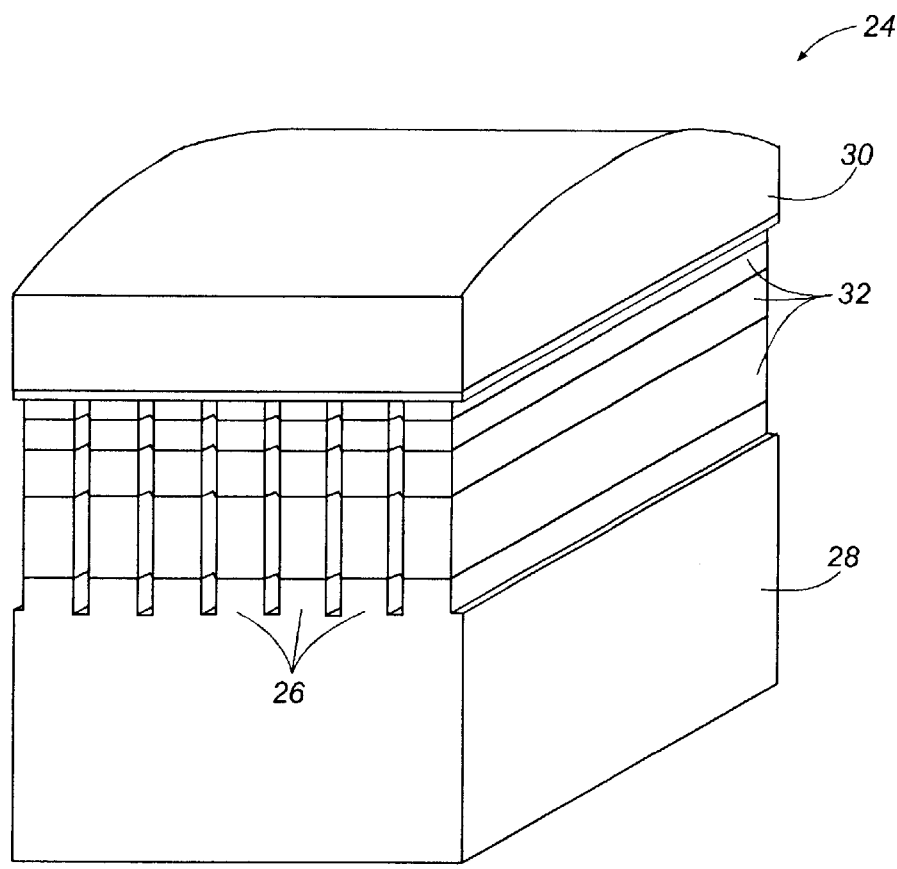
FIG. 2 is a schematic drawing of an ultrasonic transducer having single crystal element slivers and multiple matching layers.

As identified in the foregoing, disadvantages do exist for use of PMN-PT and PZN-PT single crystals. One such disadvantage concerns the difficulties associated with acoustic matching. The problem of acoustic matching can, however, be overcome through use of matching layers. In particular, the utilization of multiple matching layers can effectively couple the acoustic energy from the transducer into the body, therefore improving the bandwidth significantly. FIG. 2 illustrates an ultrasonic transducer 24 comprising single crystal element slivers 26' which also includes multiple matching layers. As shown in this Figure, the transducer comprises a backing 28 and a lens 30. Interposed between the slivers 26 and the lens 30 are, in this example, three matching layers 32. As is discussed hereinafter, the use of three such matching layers 32 in combination with single crystal slivers 26 render unexpectedly advantageous results in terms of transducer properties.

Figure 3:
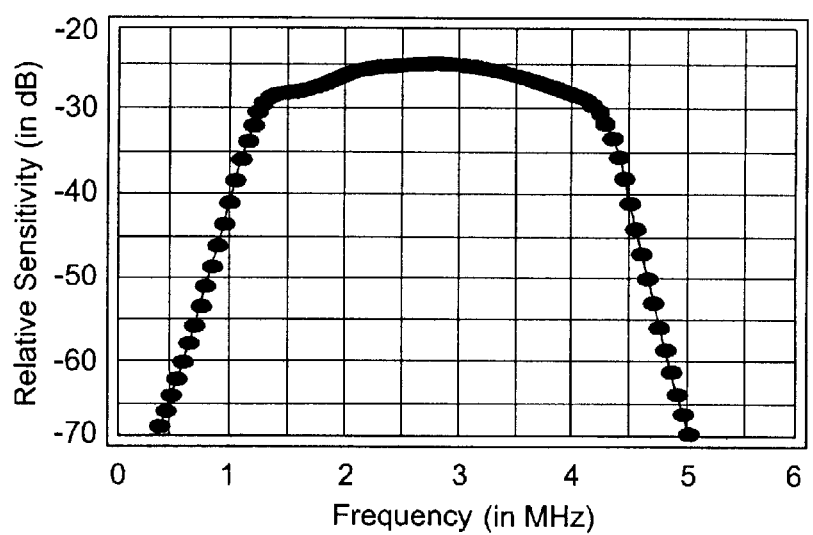
FIG. 3 is a modeled response of a wideband single crystal transducer.

To exhibit the advantageous results feasible when multiple matching layers are used, an acoustic model was used to design and optimize the single crystal transducers. Table IV lists the modeled bandwidth data of PMN-PT single crystal transducers ($<001>_t/<010>_w$ or $<011>_t/<110>_w$ 50-75 degree cuts) with various numbers of matching layers. As shown in Table II, approximately 105% of −6 dB bandwidth was determined to be possible in the model using three matching layers. FIG. 3 illustrates the modeled response.

TABLE II

Statistic bandwidth data of modeled PMN-PT single crystal transducers having with multiple matching layers

| Level (dB) | Bandwidth (−6 dB) | Bandwidth (−20 dB) | Bandwidth (−40 dB) |
|---|---|---|---|
| 2 ML Design: | 95% | 120% | 160% |
| 3 ML Design: | 105% | 130% | 160% |
| 4 ML Design: | 113% | 135% | 165% |

After this modeling was completed, an experimental prototype transducer using a PMN-PT single crystal was built which closely matches the model. A phased array transducer with a center frequency of 2.7 MHz was designed and evaluated. The transducer had 80 active elements with an element pitch of 254 µm. A single layer of PMN-PT single crystal ($<001>_t/<010>_w$, and $<011>_t/<110>_w$ 50-75 degree cuts) was used as the piezoelectric layer in conjunction with three matching layers to improve the acoustic impedance matching. An RTV acoustic lens was added in front of the matching layers to obtain the acoustic focus. The transducer was connected with a 6 feet cable with a series turning inductor.

The PMN-31%PT with sliver orientation of $<001>_t/<010>_w$ was used to build the transducer. The effective coupling constant ($k_{33}'$) of the sliver was 0.88 and clamping dielectric constant, K, was 1,200. The PMN-PT single crystal plate (<001> orientation) and matching layers were bonded together with epoxy and diced into one dimensional array. The thickness to width aspect ratio (t/w) of the sliver was about 0.5. More than 99% of the elements survived the transducer build. In the experiment, the center frequency was at 2.7 MHz with –6 dB band edges of 1.15 MHz at the low frequency side and 4.1 MHz at the high frequency side. The total –6 dB bandwidth of the transducer is:

% of $BW=100*(4.1-1.15)/2.7=109\%$

Figure 4:
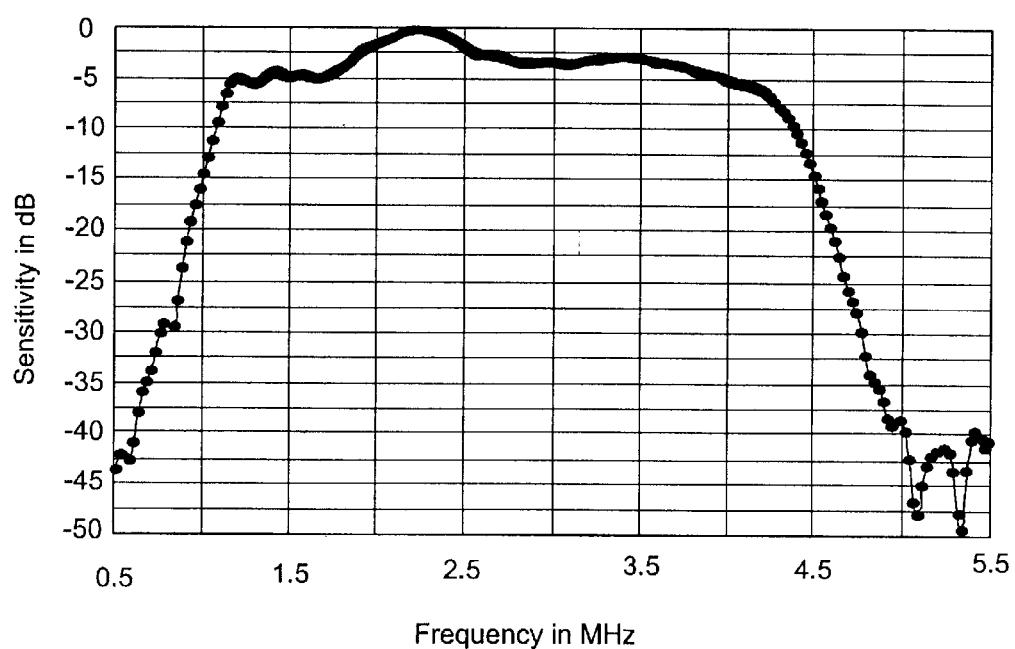
FIG. 4 is an experimental response of a wideband single crystal transducer.

The –20 dB bandwidth was 130% for this transducer. These data indicate that a very wide bandwidth (more than 100% of –6 dB bandwidth) can be obtained in single crystal transducers with optimized electrical and acoustic design. The extra bandwidth achieved from this three matching layer single crystal transducer can offer a wider range of second harmonic frequency choices. For example, the transmitting fundamental frequencies can be selected at 1.2, 1.5, 1.8, and 2.0 MHz, and the receiving second harmonic frequencies can be selected at 2.4, 3.0, 3.6, and 4.0 MHz. FIG. 4 shows the experimental spectral response of PMN-PT single crystal transducer.

In addition to acoustic matching, another concern regarding use of PMN-PT and PZN-PT materials is that the piezoelectric and dielectric properties of PMN-PT and PZN-PT single crystal materials are not stable near the MPB due the phase transition from rhombohedral to tetragonal phases. The PMN-PT crystals grown by the Bridgman technique have shown a compositional fluctuation along the growing axis; Ti content continuously drifting along the growing direction. This characteristic makes the usage of these crystals more difficult for compositions near the MPB regions. Away from the MPB, the piezoelectric and dielectric constants of rhombohedral phase crystals are more uniform. However, these compositions have an even lower Curie temperature compared to the typical PZT-type ceramics used for medical imaging applications, and therefore are more susceptible to depoling during the fabrication, and device storage/operating temperature changes.

Figure 5:
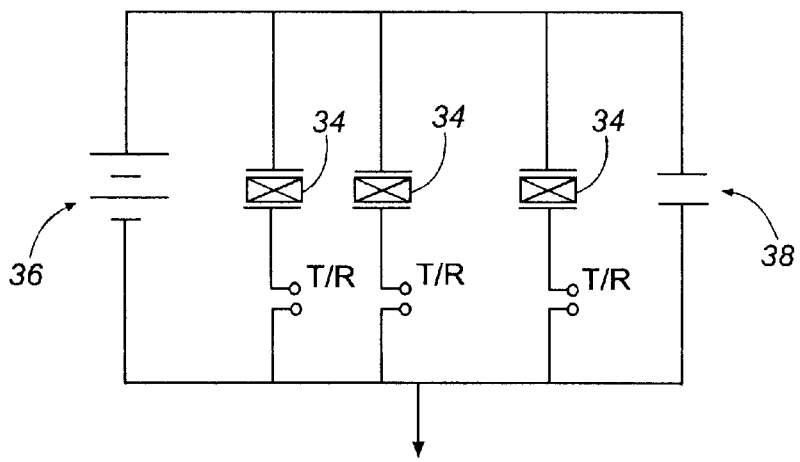
FIG. 5 is a electrical schematic illustrating voltage biasing of a single crystal transducer.

To improve temperature stability of single crystal transducers, it has been determined that a voltage bias (e.g., DC bias) can be applied to the transducer to maintain the polarization of the transducer during operation. Under this bias, the piezoelectric element material is highly polarizable and it maintains its high piezoelectric properties. Because the dielectric and piezoelectric properties of single crystals with low PT content depend upon the magnitude of the DC bias applied, the pulse-echo response of a transducer element can be at least partially controlled by varying the magnitude of the DC bias. FIG. 5 is an electrical schematic which illustrates how this bias can be applied to a plurality of piezoelectric element slivers 34. As indicated in the figure, the DC bias is applied to the slivers 34 with a voltage source 36 that is connected to each of the slivers 34 in parallel. Also connected in the circuit is a bypass capacitor 38 which allows the transmitted signal to drain (i.e., go to ground). In addition, the transmitters and receivers are identified by the designation T/R.

Figure 6:
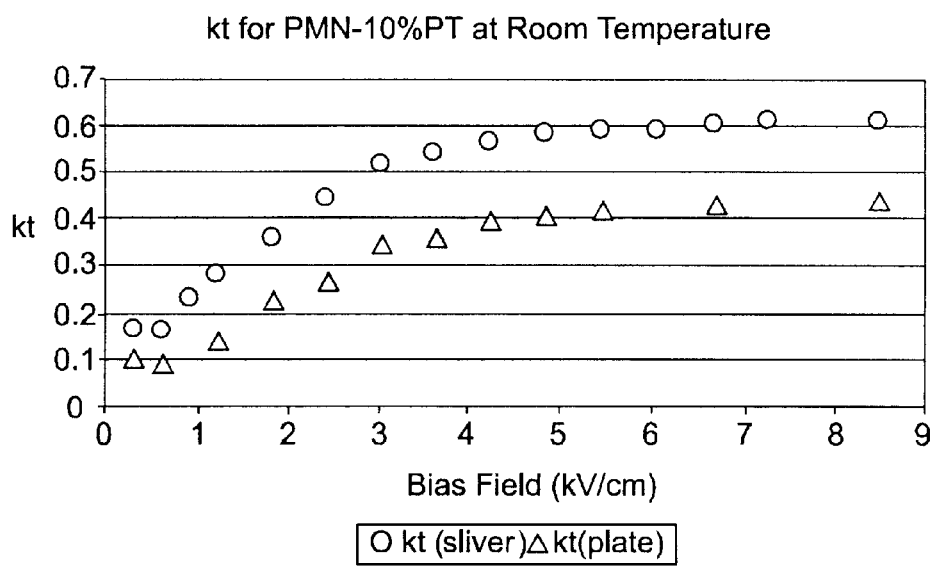
FIG. 6 is a plot of the coupling constant of a PMN-10%PT material as a function of bias voltage.

By utilizing a DC bias, the designer can add one more degree of freedom in the development of the transducers. For PMN-PT and PZN-PT systems, this allows the transducer to be operated under an extremely wide composition range, even those in which depoling would occur if bias were not applied to the crystal. Since the bias voltage can stabilize the polarization, the PMN-PT and PZN-PT single crystals can be used in devices with very low phase transition temperatures from rhombohedral to cubic and also from rhombohedral to tetragonal. By way of example, from approximately 10% to 40% by composition of PT in PMN-PT systems, and from approximately 3% to 12% by composition of PT in PZN-PT systems are possible. FIG. 6 shows the plot of the coupling constant of PMN-10%PT single crystal as a function of bias voltage. As shown in the graph, when the bias voltage is removed, the material loses its polarization and the coupling constant drops to less than 0.2. Although the Curie temperature is at 75° C. for this material, the polarization is not stable even at room temperature. Therefore, a bias voltage is required to maintain the piezoelectric properties. One of the advantages of using PMN-PT and PZN-PT with low PT contents is that the dielectric constants of these compositions are higher than the compositions near the MPB. For example, the free dielectric constant for PMN-10%PT is about 14,000 vs. 5,000 for PMN-30%PT. For compositions in between PMN-15%PT to PMN-30%PT, the polarization may be stable at the room temperature, but it may not be stable under extreme driving or storage conditions.

In some instances, a constant application of bias may not be necessary. Accordingly, the polarization of the single crystal transducers can be refreshed during each regular operation. In addition, a poling voltage can also be added periodically to the single crystal layer(s) to maintain the bandwidth and sensitivity of the transducer. Furthermore, the poling voltage can be added during the operations or between the mode switching from 2D imaging to Doppler, or from Doppler to Color Flow, and the like. In such cases, a constant DC bias is not required during the regular operation.

Figure 7A:
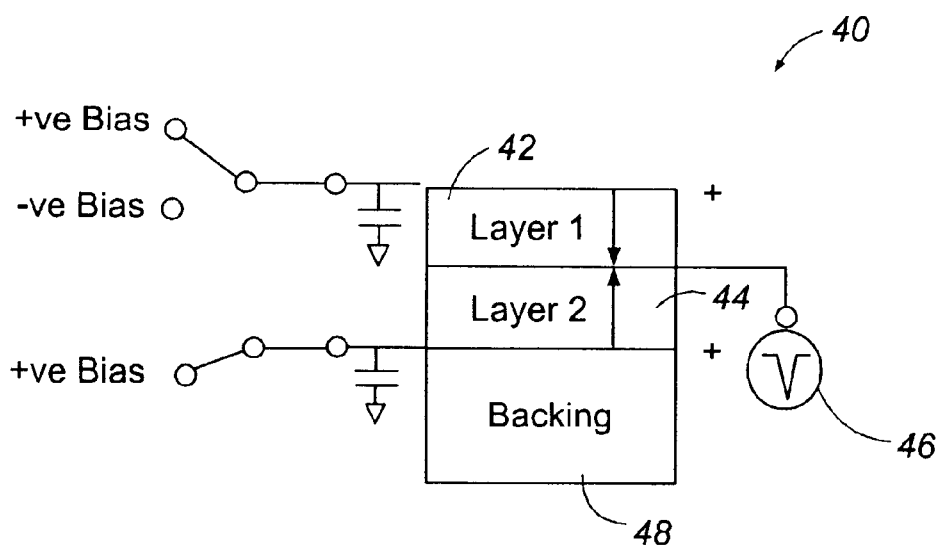
FIGS. 7A–7B are schematic representations of multiple layered, single crystal transducer elements.
Figure 7B:
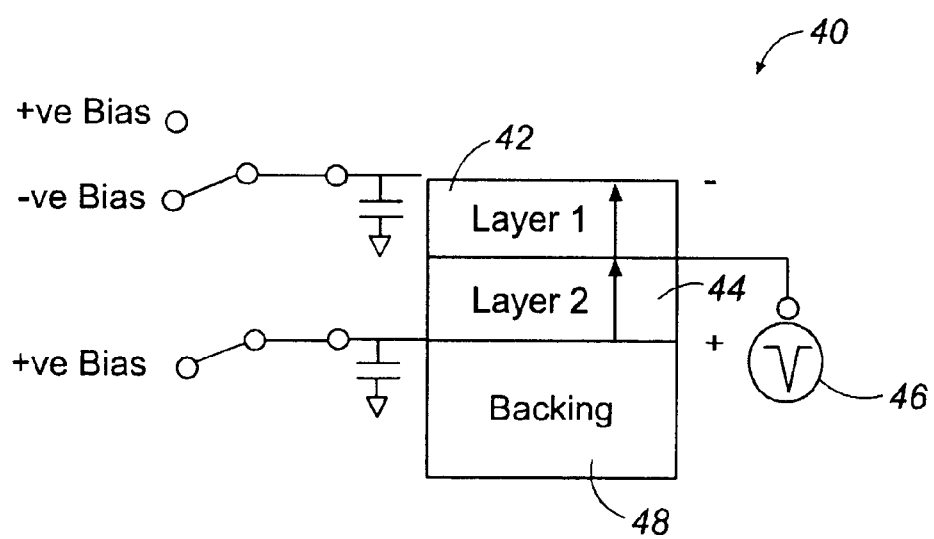

In addition to the use of matching layers and voltage biasing, advantageous results can also be obtained with multiple single crystals. FIGS. 7A and 7B illustrate an exemplary multiple layer, single crystal transducer 40. As shown in these figures, the transducer 40 comprises a stack of two layers 42, 44 of single crystals of either PMN-PT or PZN-PT which are connected electrically in parallel. Although two such layers are shown for the purposes of example, it is to be understood that greater than two layers could be used, if desired. A voltage source 46 is also provided, as is a backing 48. The polarization of each single crystal layer 42, 44 can be selected independently with a DC bias of a particular polarity. When these layers 42, 44 are acoustically poled in series or in parallel, the stack can be excited to produce two different resonance frequencies. In the first case, as shown in FIG. 7A, the two layers 42, 44 are acoustically in series, although they have polarizations that directly oppose each other (either through initial poling or the application of a voltage bias). When an excitation pulse is applied to the pair, the structure resonates in the same manner as a single layer whose thickness is the sum of the thickness of the double layers. The resonance frequency of the stack is given by:

$$f_1 = v/4t = f_o \quad \text{[Equation 1]}$$

where v is the sound velocity of the single crystal and t is the thickness of each layer. Therefore, the arrangement shown in FIG. 7A is particularly useful in obtaining lower frequencies.

In the second case, depicted in FIG. 7B, the electric fields and polarization in each layer 42, 44 are in the same direction. Because of this arrangement, when an electric field is applied to the central electrode, the structure resonates in the same manner as a single layer whose thickness is equal to the thickness of each individual layer. The resonance frequency of the stack is given by:

$$f_2 = v/2t = 2 \ast f_o \quad \text{[Equation 2]}$$

From this, it can be appreciated that the arrangement shown in FIG. 7B is particularly useful to produce higher frequencies.

Another advantage of double or multi-layer designs is that the electrical impedance of the transducer can be dramatically reduced to more closely match the transducer with the medium being examined. The small element size and high electrical impedance of single layer transducer arrays may hurt the signal to noise ratio for a wideband design. In the case of a multi-layer array comprising n layers of single crystals electrically connected in parallel, the capacitance of each element is increased by a factor of n. In addition, when the layers are acoustically in series (as shown in FIG. 7A), the total thickness of the stack is divided by the number of layers and thereby increases the capacitance by another factor of n. This high capacitance allows the transmitter to communicate with the transducer elements more efficiently, therefore improving the signal to noise ratio and increasing the bandwidth.

Specific Applications

Because of the beneficial properties of PMN-PT and PZN-PT materials, transducer elements comprising single crystals of these materials can be utilized in many different applications. As explained above, particularly advantageous results can be obtained in both tissue and contrast harmonic imaging. Although harmonic imaging has been performed in the past, the harmonic performance cannot be optimized due to the bandwidth limits of the transducers. With transducers such as those described herein, however, one single transducer can be designed to do the job of two or more conventional PZT transducers.

Figure 8:
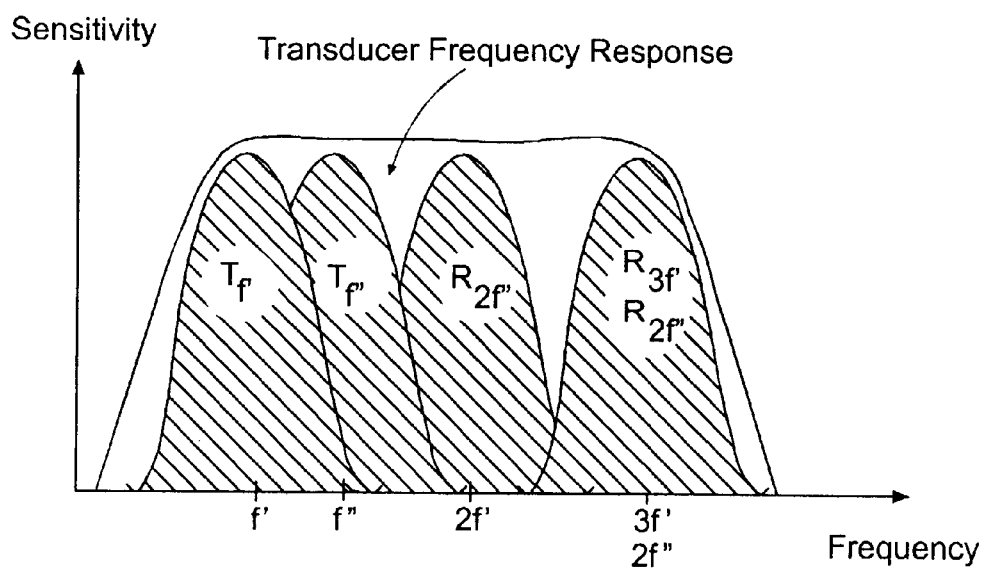
FIG. 8 is a schematic spectral response of a wideband single crystal transducer illustrating the use of multiple transmitting and receiving frequencies.

An advantage of using the combined second and the third harmonic imaging is that the fundamental frequency of the transducer can be shifted to very low frequencies such as those below 1.5 MHz. This fact is illustrated in FIG. 8. In the example shown in this figure, two low frequency waves (f', f'') are transmitted at the same time. The echoes of these frequencies will be generated at a frequency 3f' which is both the third harmonic frequency for f' and the second harmonic frequency for f'' (here 3f'=2f''). Both signals can be received at 2f' and 3f'' simultaneously and then combined with proper gain control to form a mixed harmonic image. As is evident from this discussion, the extra bandwidth of single crystal transducers gives an additional degree of freedom to processing the harmonic signals over a wide frequency range.

With such wide bandwidth, it may be advisable to avoid transmitting energy at the harmonic frequency because this energy can be confused with the harmonic signals returning to the transducer from the object or contrast agent being imaged. In particular, this overlap of signals can create noise that will lower image quality. One solution to this problem is to simply filter the harmonic components of the transmitted signal so that these signals will not be received by the transducer. An alternative to this solution is to utilize an arbitrary waveform generator which controls the shape of the transmitted waveform such that its spectrum has very few harmonic components. As known in the art, it may also be advisable to cancel the fundamental signal so that only harmonic signals are received by the transducer. One method of accomplishing this cancellation is through pulse inversion. With this technique, the transducer is configured so as to fire a fundamental pulse as well as an inverted pulse of equal magnitude so that the fundamental frequency is transmitted to the object to be imaged, but its echo canceled so that only the harmonic signals are received and imaged. Another method of accomplishing this cancellation is through amplitude modulation. With this technique, the transducer is fired to transmit different magnitude of pulses and the fundamental signals are cancelled.

The additional bandwidth available from the herein described transducers can be particularly useful in contrast harmonic imaging. When imaging contrast agents, both the agents and the surrounding tissue generate harmonic signals. In that the tissue harmonic signals act to obscure the image of the contrast agent image, the tissue harmonic signals constitute noise that should be removed. It has been determined that when an ultrasound contrast agent is destroyed it emits broad bandwidth energy, while tissue only produces energy at the harmonics. Therefore, if a filter (e.g., an RF filter) is placed between the harmonics (e.g., between the second and third), the contrast agent bubble signal will not be obscured by the tissue noise signals.

It has been shown that contrast agents are destroyed more efficiently at lower frequencies of ultrasound. This phenomenon can be beneficial in many cases. For instance, it is possible to destroy the contrast agent bubbles and to correlate the reflow time with the blood flow of an organ of a patient. If a particular area of the organ fills in more quickly than another, the blood flow is higher in that particular area. Unfortunately, despite the benefit this technique provides, resolution may be sacrificed. The conventional solution to this problem has been to destroy the bubbles at a low frequency with a first transducer and receive the harmonics at a higher frequency with another transducer. However, as mentioned above, with the transducer of the present invention, a single transducer can replace two or more conventional transducers. For instance, a single transducer of the type described herein can be used to transmit part of its array at one frequency and another part of the array (or the same part) at another frequency.

Figure 9:
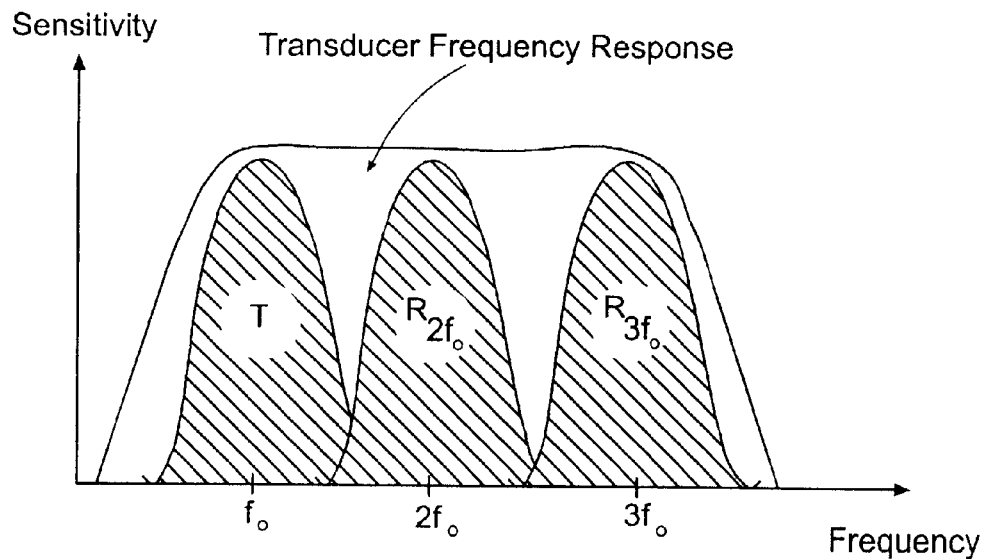
FIG. 9 is a schematic spectral response of a wideband single crystal transducer illustrating the possibility of combining second and third harmnonics.

Because of bandwidth limitations created through use of conventional PZT-type materials, second and third harmonic signals have not been utilized to their full benefit. However, with the materials and techniques described herein, potentially even more advantageous imaging can be obtained by combining the second and the third harmonic signals. In that the second harmonic signal offers better signal to noise ratio and the third provides better resolution, an improved image may be obtained when the two are combined. FIG. 9 demonstrates a schematic spectral response of a wideband single crystal transducer showing the second and third harmonic signals which can be combined for harmonic imaging. In this figure, $f_o$, $2f_o$, and $3f_o$ indicate the received first, second, and the third harmonic frequencies, respectively (here $f_o$=transmitted fundamental frequency). The second and third received harmonic frequencies ($R_{2f}$, $R_{3f}$) shown in the figure can be obtained simultaneously by setting separated, parallel receiving filters (not shown) at the second and the third harmonic frequencies. Once these two frequencies have been received, the two image obtained from the second and the third harmonic frequencies can then be combined together with a digital mixer (not shown). In such a combination, the third harmonic signal can be relied upon more heavily for the near field image to improve the shallow depth clutter noise, and far field images can be imaged by relying upon the second harmonic signal more heavily for better penetration. Therefore, by combining the two images together, a hybrid image having greatly improved resolution can be obtained. Moreover, in that the two different images have different speckle patterns, these speckle patterns tend to cancel each other out, thereby producing an even more clear image.

Figure 10:
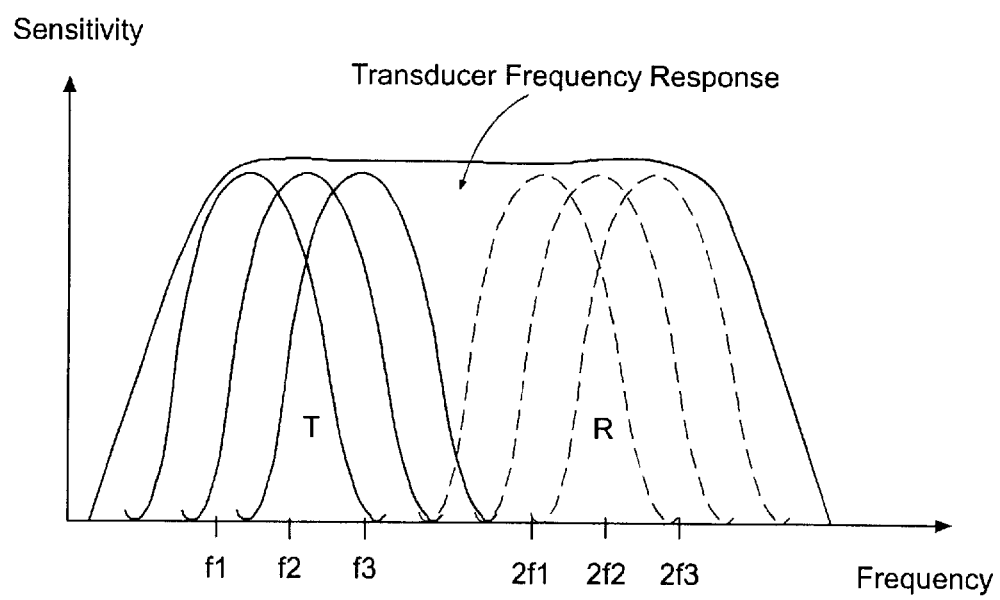
FIG. 10 is a schematic spectral response of a wideband single crystal transducer with multiple harmonic frequency selections.

To further illustrate the benefits of wide bandwidth, FIG. 10 demonstrates transmission and receipt of multiple signals for a wideband single crystal transducer. In particular, illustrated is the schematic spectral response of a single crystal transducer with multiple harmonic frequency selections in one transducer. In this figure, $f_1$, $f_2$, and $f_3$ indicate example transmitting fundamental frequencies, while $2f_1$, $2f_2$ and $2f_3$ indicate the associated receiving second harmonic frequencies. As is evident from the figure, through use of single crystal transducer elements, a very wide bandwidth with high sensitivity can be created so as to permit the transmission of various transmitting frequencies as well as the receipt of various receiving frequencies.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims.

What is claimed is:

1. An ultrasonic imaging system for harmonic imaging of an object in a medium, said system comprising:
   a transducer formed of a single crystal of a piezoelectric material, said transducer being composed of a plurality of elements;
   a transmitter for transmitting fundamental ultrasound signals into the medium;
   a receiver for receiving a plurality of harmonic ultrasound signals reflected from the object in the medium; and
   a control system electrically connected to said transmitter and said receiver, said control system used to control the operation of said transmitter and said receiver;
   wherein said control system includes a mixer for mixing a predetermined number of the plurality of harmonic ultrasound signals received by said transducer formed of a single crystal to form an image of the object.

2. The system of claim 1, wherein the predetermined number of the plurality of harmonic ultrasound signals received by the transducer and mixed by said mixer is three.

3. The system of claim 1, wherein said single crystal of piezoelectric material comprises an oriented polycrystal.

4. The system of claim 1, wherein said single crystal of piezoelectric material comprises a PMN-PT material.

5. The system of claim 4, wherein said PMN-PT material is approximately 10% to 40% PT by composition.

6. The system of claim 1, wherein said single crystal of piezoelectric material comprises a PZN-PT material.

7. The system of claim 6, wherein said PZN-PT material is approximately 3% to 12% PT by composition.

8. The system of claim 1, wherein said single crystal of piezoelectric material has been cut along a <001> thickness orientation.

9. The system of claim 1, wherein said single crystal of piezoelectric material has been cut along a <011> thickness orientation.

10. The system of claim 1, wherein said single crystal of piezoelectric material has an effective coupling constant, $k_{33}'$, of at least approximately 0.85.

11. An ultrasonic imaging system for harmonic imaging of an object in a medium, said system comprising:
    a transducer formed of a single crystal of a piezoelectric material; said transducer being composed of a plurality of elements;
    a transmitter for transmitting fundamental ultrasound signals into the medium;
    a receiver for receiving at least one harmonic ultrasound signal reflected from the object in the medium; and
    a control system electrically connected to said transmitter and said receiver, said control system used to control the operation of said transmitter and said receiver;
    wherein said transducer has a −6 dB bandwidth of at least approximately 105%.

12. The system of claim 1, wherein said transducer comprises at least two matching layers.

13. An ultrasonic imaging system for harmonic imaging of an object in a medium, said system comprising:
    a transducer formed of a single crystal of a piezoelectric material; said transducer being composed of a plurality of elements;
    a transmitter for transmitting fundamental ultrasound signals into the medium;
    a receiver for receiving at least one harmonic ultrasound signal reflected from the object in the medium; and
    a control system electrically connected to said transmitter and said receiver, said control system used to control the operation of said transmitter and said receiver;
    wherein said transducer comprises at least three matching layers.

14. The system of claim 1, wherein said transducer comprises at least two layers comprising at least one single crystal of a piezoelectric material.

15. The system of claim 14, wherein said at least two layers are acoustically arranged in parallel.

16. The system of claim 14, wherein said at least two layers are acoustically arranged in series.

17. The system of claim 1, wherein said transducer comprises a transesophageal probe.

18. An ultrasonic imaging system, comprising:
    a transducer formed of a single crystal of a piezoelectric material, said transducer including a base portion, a plurality of elements, a lens, and at least three matching layers interposed between said single crystal elements and said lens;
    a transmitter for transmitting ultrasound signals into the medium;
    a receiver for receiving ultrasound signals reflected from the object in the medium; and
    a control system electrically connected to said transmitter and said receiver, said control system used to control the operation of said transmitter and said receiver.

19. The system of claim 18, wherein said single crystal of piezoelectric material comprises one single grain of material.

20. The system of claim 18, wherein said single crystal of piezoelectric material comprises an oriented polycrystal.

21. The system of claim 18, wherein said single crystal of piezoelectric material comprises a PMN-PT material.

22. The system of claim 18, wherein said single crystal of piezoelectric material comprises a PZN-PT material.

23. The system of claim 18, wherein said single crystal of piezoelectric material has been cut along the <001> thickness orientation.

24. The system of claim 18, wherein said single crystal of piezoelectric material has been cut along the <011> thickness orientation.

25. The system of claim 18, wherein said single crystal of piezoelectric material has an effective coupling constant, $k_{33}'$, of at least approximately 0.85.

26. The system of claim 18, wherein said transducer has a −6 dB bandwidth of at least approximately 105%.

27. The system of claim 18, wherein said transducer comprises at least two layers at least one comprising a single crystal of a piezoelectric material.

28. The system of claim 27, wherein said at least two layers are acoustically arranged in parallel.

29. The system of claim 27, wherein said at least two layers are acoustically arranged in series.

30. The system of claim 18, wherein said transducer comprises a transesophageal probe.

31. An ultrasonic imaging method for imaging an object, comprising:
  causing a transducer formed of a single crystal of piezoelectric material to emit a first ultrasound signal at a fundamental frequency;
  receiving first echoes at a harmonic frequency of the fundamental frequency;
  receiving second echoes at another harmonic frequency of the fundamental frequency; and
  processing the first and second echoes to produce an image of the object.

32. The method of claim 31, wherein a transmit frequency is broad enough such that the signal generated can be received in the frequency range of at least two individual second harmonic frequencies.

33. The method of claim 31, wherein at least a third harmonic frequency is received.

34. The method of claim 31, wherein at least a fourth harmonic frequency is received.

35. The method of claim 31, wherein the piezoelectric material comprises a PMN-PT material.

36. The method of claim 31, wherein the piezoelectric material comprises a PZN-PT material.

37. The method of claim 31, further comprising the step of applying a voltage bias to the piezoelectric material.

38. The method of claim 31, further comprising the step of filtering the harmonic components of the transmitted signal so that it will not be received by the transducer.

39. The method of claim 31, further comprising the step of canceling the fundamental frequency through pulse inversion so that it will not be received by the transducer.

40. The method of claim 31, wherein the harmonic imaging is contrast harmonic imaging, further comprising the step of receiving signals between harmonic frequencies to remove noise.

41. The method of claim 31 further comprising causing the transducer to emit a second ultrasound signal at the fundamental frequency simultaneously with the first ultrasound signal.

42. The method of claim 41, wherein the first and second ultrasound signals emitted at the fundamental frequency are created by transmitting a shaped pulse to all single crystal elements.

43. The method of claim 41, wherein the first and second ultrasound signals emitted at the fundamental frequency are created by transmitting a portion of the array elements at a first frequency and another portion of the single crystal elements at a second frequency.

44. The method of claim 31, wherein the transmitted frequency is lower than 1.5 MHz.

45. An ultrasonic imaging method for imaging an object, comprising:
  causing a transducer formed of a single crystal of piezoelectric material to emit an ultrasound signal at a fundamental frequency;
  receiving first echoes at a harmonic frequency of the fundamental frequency;
  receiving second echoes at another harmonic frequency of the fundamental frequency; and
  processing the first and second echoes to produce an image of the object;
  wherein the transducer has at least three matching layers.

46. The method of claim 31, wherein at least two of the harmonic echoes are combined to form a hybrid harmonic image.

47. The method of claim 46, wherein the step of combining the harmonic frequencies is performed by a digital mixer.

* * * * *